June 13, 1950  C. G. HASKELL  2,511,109
STUFFING BOX
Filed Dec. 15, 1947
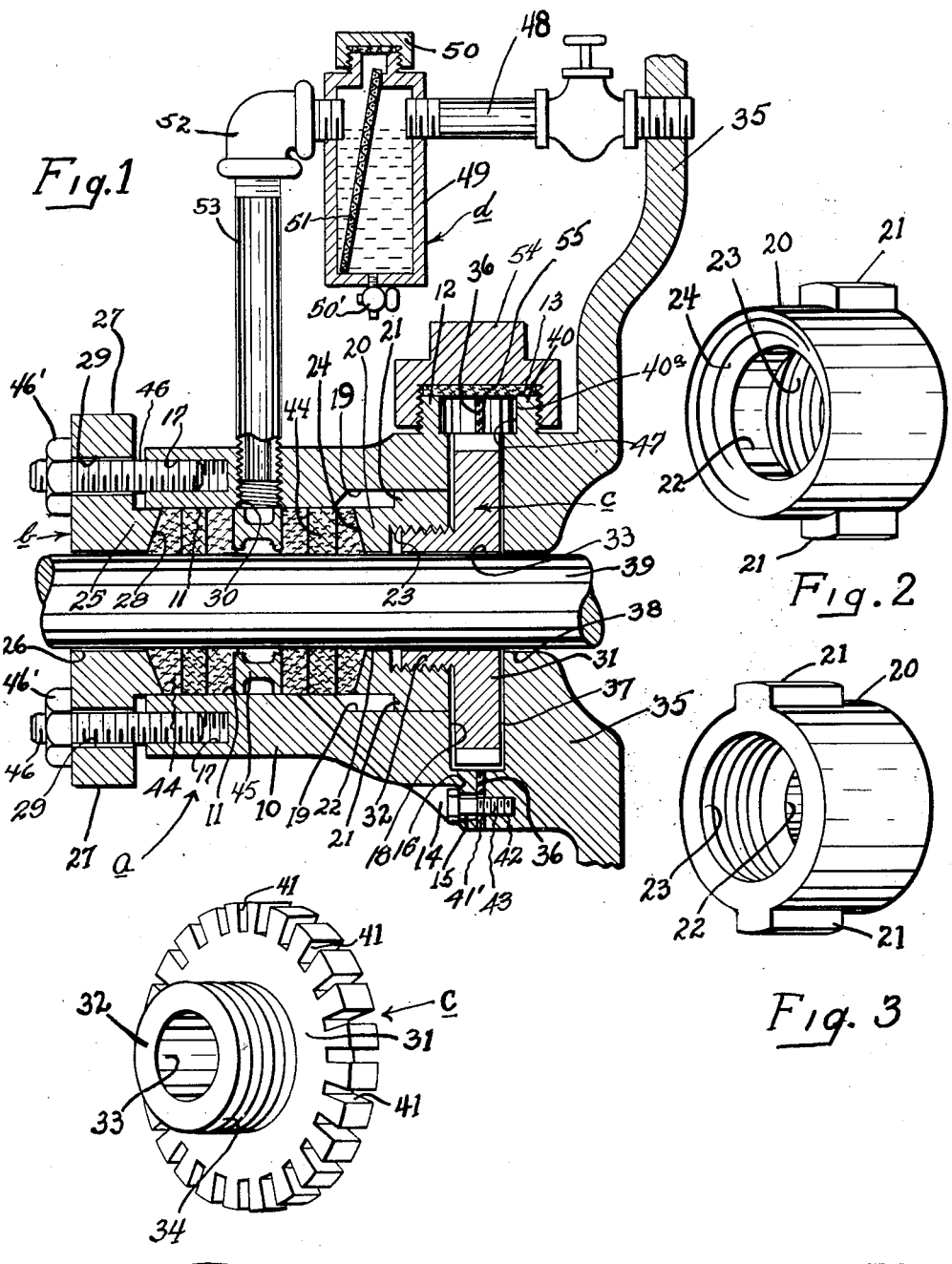
INVENTOR.
Chester G. Haskell
BY
Wilfred E. Lawson
ATTORNEY Patented June 13, 1950

2,511,109

UNITED STATES PATENT OFFICE 2,511,109

STUFFING BOX

Chester G. Haskell, Los Angeles, Calif.

Application December 15, 1947, Serial No. 791,773

3 Claims. (Cl. 286—27)

My invention relates to stuffing boxes and more particularly to that type of stuffing boxes that are provided with a metal water seal.

The main object of my invention is to provide a stuffing box, the packing rings of which are subjected to adjustable pressure from both the outer and the inner end of the stuffing box.

Another object of my invention is to provide a stuffing box of the character indicated above, equipped with an adjustable outer gland adapted to exert pressure on the packing rings from the outer end of the stuffing box and with an inner adjustable gland adapted to exert pressure on the packing rings from the inner end of the stuffing box.

A further object of my invention is to provide a stuffing box of the character indicated above having a substantially cylindrical hollow body adapted to be removably secured to the housing of a pump or the like.

Other objects of my invention may appear in the following specification describing my invention with reference to the accompanying drawing illustrating a preferred embodiment of my invention. It is however to be understood, that my invention is not to be limited and restricted to the exact construction and combination of parts described in the specification and shown in the drawing, but that such changes and alterations can be made which fall within the scope of the claims appended hereto.

In the several figures of the drawing similar parts are indicated by similar reference characters and Figure 1 is a view of a stuffing box according to my invention partly in section and partly in side elevation, shown mounted on a fragmentarily shown pump housing.

Figure 2 is a perspective view of the rear gland used in connection with my invention, taken from the front end of said gland.

Figure 3 is a perspective view of the rear gland taken from the rear end thereof, and Figure 4 is a perspective view of a wheel used in the stuffing box according to my invention for the purpose of adjusting the rear gland of said stuffing box.

The stuffing box a forming the subject matter of my invention comprises a substantially cylindrical body 10 provided with the bore 11 extending therethrough. Adjacent its inner end, the body 10 is equipped with a semi-cylindrical lug 12 extending radially outwardly from said body and arranged thereon so that the surfaces 13 on the ends of the semi-cylindrical lug 12 are located in the same plane with the inner end surface of the body 10. A plurality of recesses 14 are formed in the circumferential surface of the body 10 at a distance above the inner end surface of said body, and a hole 15 is provided centrally in the bottom wall 16 of each recess 14. A plurality of tapped holes 17 is arranged in the outer surface of the body 10. At the lower end of the bore 11 of the body 10 a counterbore 18 is provided, which is somewhat shallower than the inner curve of the semi-cylindrical lug 12. Two keyways 19 are cut into the inner surface of the body 10 and are arranged diametrically opposite to each other. They extend from the inner end of the body 10 partway into said body.

A rear gland 20 has a substantially cylindrical shape and fits slidably into the bore 11 of the body 10. On the circumferential surface of the rear gland 20 two keys 21 fit slidably into the keyways 19 in the body 10. The rear gland has a bore 22 provided at its inner end with a threaded counterbore 23. The outer surface 24 of the rear gland 20 is slightly countersunk.

An outer gland b has a substantially cylindrical body 25 provided with a bore 26. The gland body 25 fits slidably into the bore 11 of the stuffing box body 10. On the outer end portion of the gland body 25 a circumferential flange 27 is formed, and the inner end surface of the outer gland body 25 is slightly countersunk, as shown at 28 in Figure 1. A plurality of holes 29 are arranged in the circumferential flange 27, so that these holes are adapted to be positioned coaxially with the tapped holes 17 in the outer surface of the stuffing box body 10.

Intermediate the ends of said stuffing box body 10 is a tapped hole 30 extending radially to said body through the wall thereof for a purpose to be described later.

An adjusting wheel c has a disc-like main portion 31, on which an axially extending hub 32 is formed. A bore 33 extends through the main portion and the hub, and the diameter of this bore is equal to the diameter of the bore 26 of the outer gland b and of the bore 22 of the inner or rear gland 20.

The stuffing box body 10 is adapted to be mounted on a pump housing 35 or the like, on which an annular outwardly extending seat flange 36 is formed surrounding a shallow counterbore 37 of a hole 38 in the housing wall permitting a shaft 39 to enter the pump housing. A semi-cylindrical lug 40 extends radially outwardly from the seat flange 36 and the dimensions of this semi-cylindrical lug are equal to the dimensions of the semi-cylindrical lug 12 on the stuffing box housing 10.

The stuffing box a is assembled in the following manner: The inner or rear gland 20 is inserted into the inner end of the body bore 11 so that the slightly countersunk end 24 of the rear gland 20 enters the bore first and the keys 21 of said gland engage the keyways 19 in the body 10. The outside diameter of the main portion 31 of the adjusting wheel c is such that said wheel fits rotatably into the counterbore 18 in the inner end of the stuffing box body 10. In the circumferential surface of the disc-like adjusting wheel portion, a plurality of axially extending notches 41 are provided permitting the insertion of a screw driver or similar tool (not shown) to impart rotary movement to the wheel c, so that the threaded hub 32 of the adjusting wheel engages the threaded counterbore 23 of the rear gland 20 and the adjusting wheel c is slipped over the shaft 39, so that the inner end of the body 10 abuts a gasket 41' placed onto the seat flange 36 and the two semi-cylindrical lugs 12 and 40 abut each other and form a hollow cylindrical member 40a permitting admission to the adjusting wheel c. A plurality of tapped holes 42 are provided in the seat flange 36 and these holes are arranged so that the holes 15 in the bottom of the recesses 14 in the main body 10 are positioned coaxially with the tapped holes 42, when the two semi-cylindrical lugs 12 and 40 are in the position described above. Bolts 43 extend through the holes 15 and engage the tapped holes 42 to secure the stuffing box body 10 in position on the pump housing 35. A plurality of packing rings 44 are inserted into the bore 11 of the body 10 and surround the shaft 39. They are forced inwardly until they abut the rear gland 20 and fill the space between said gland and the innermost portion of the tapped hole 30 in the wall of the body 10. A metal water seal 45 is then inserted into the body bore 11, surrounding the shaft 39 and is forced back until it abuts the foremost packing ring 44. Then more packing rings 44 are arranged in the body bore, and the outer gland b is mounted on the stuffing box body 10 by means of bolts 46 extending through the holes 29 in the circumferential flange 27 of the outer gland b and engaging the tapped holes 17 in the outer end surface of the stuffing box body 10. The body 25 of the outer gland b extends into the bore 11 of the stuffing box body 10 and engages the outermost packing rings 44. By tightening the nut 46' on bolts 46, the outer gland b is urged deeper into the body bore 11 thereby compressing the packing rings 44.

The pressure exerted by the outer gland b compresses the outer packing rings more than the rings located rearwardly of the water seal 45, and in consequence the excessive pressure exerted by the outer packing rings on the shaft rotating in the stuffing box will wear a groove into said shaft. The inner or rear gland 20 is adapted to be urged toward the inner packing rings by imparting rotary movement to the adjusting wheel c. This is done by inserting a screw driver (not shown) or the like through the bore 47 in the hollow cylindrical member 40a formed by the semi-cylindrical lugs 12 and 40, into one of the notches 41 in the disc-like portion 31 of the adjusting wheel c and engaging the wall of said notch. In this manner the pressure of the packing rings 44 on the shaft 39 is equalized and the excessive pressure of the outer packing rings is eliminated.

As shown in Figure 1, a water supply pipe 48 extends through the pump housing wall 35. On the outer end of this pipe a sediment trap d is secured, consisting in a housing 49 closed on its top by a screw cap 50 and provided in its bottom with a drain cock 50'. Inside the trap housing 49 a screen 51 is arranged in steeply inclined position. Opposite from the water supply pipe 48 an elbow 52 is connected with the trap housing and from this elbow a conduit pipe 53 leads to and engages the tapped hole 30 in the wall of the stuffing box body 10, so that water flowing from the pump through the supply pipe 48 will accumulate in the trap housing 49, and any sand, silt or the like contained in the water will settle in the trap housing and be retained by the screen 51, the steeply inclined position of which causes the silt retained by said screen to drop away therefrom. The strained water flows through the elbow 52 and the conduit pipe 53 to the water seal 45 located in the stuffing box body 10 under the inlet hole 30.

In this manner the shaft 39 is protected also against abrasive action caused by silt or the like contained in the water flowing from the pump to the water seal.

The hollow cylindrical member 40a formed by the two semi-cylindrical lugs 12 and 40 is threaded on its outside and a screw cap 54 closes the open upper end of this member. A gasket 55 may be arranged between said member and the screw cap 54.

Having described my invention I claim as new and desire to secure by Letters Patent:

1. A stuffing box having a body provided with a bore adapted to receive a plurality of packing rings and a metal water seal ring therein, one half of the packing rings being located inwardly from the water seal ring and the other half outwardly therefrom, means for exerting adjustable pressure from the outer end of the stuffing box on the packing rings, means for exerting adjustable pressure from the inner end of the stuffing box on the packing rings, said body being removably mounted on a seat flange provided on the housing of a pump or the like and surrounding the admission hole for the pump shaft, said body being provided with a pair of axial keyways in its inner surface, arranged diametrically opposite to each other and extending partway inwardly of the body from a shallow counterbore provided in the rear end of the body, an inner gland slidably fitting in the body bore and provided with a bore and two inwardly extending keys slidably fitting in said keyways, and means for propelling and retracting the inner gland, said means consisting of an adjusting wheel having a disc-like main portion and outwardly threaded hub extending from said disc-like portion and adapted to engage an inward thread provided in a rearward counterbore of the inner gland, said disc-like adjusting wheel portion being provided with axial notches in its circumferential surface and rotatably arranged in the shallow counterbore in the rear end of the body, the rear end of the stuffing box body and the front end of the seat flange being provided each with a semicircular lug extending outwardly and radially from said parts and forming together an open cylindrical member permitting admission to the adjusting wheel and removable means for closing the outer open end of the cylindrical member.

2. In association with a housing having a wall provided with a seat flange and a shaft opening through said flange, a stuffing box comprising a cylindrical housing having one end positioned against said seat flange and coaxial with the shaft opening whereby a shaft passing through the opening extends axially through the stuffing box body, said stuffing box body being adapted to receive a plurality of packing rings and a metal water seal therein, the packing rings being divided with the water ring lying centrally between the divisions, a gland fixed in the outer end of the stuffing box body to bear against the rings in the outer end thereof, a gland positioned in the inner end of the stuffing box body and having a central passage for the shaft, the last mentioned gland bearing against the packing rings in the inner end of the body, means slidably connecting the last mentioned gland with the stuffing box body whereby the second mentioned gland is held against rotation but permitted axial movement, a wheel housed between said flange and the inner end of the stuffing box body and having a central aperture for the passage of the shaft, the wheel having an externally threaded hub upon the outer side thereof, the second mentioned gland having an internally threaded counterbore in which said threaded hub engages, and means by which rotation of the wheel may be effected from outside of the stuffing box body.

3. A structure of the character set forth in claim 2, in which the means for housing the wheel between the seat flange and the adjacent end of the stuffing box comprises corresponding recesses formed in the opposing faces of the flange and stuffing box, providing a chamber in which the wheel is positioned, and the said means facilitating rotation of the wheel from outside the stuffing box body comprises an outwardly directed opening leading into said chamber and a closure member overlying the opening, the said wheel having its periphery disposed through said opening for engagement by an operating tool.

CHESTER G. HASKELL.

REFERENCES CITED

The following references are of record in the file of this patent:

UNITED STATES PATENTS

| Number | Name | Date |
|---|---|---|
| 479,877 | Grimm | Aug. 2, 1892 |
| 868,377 | Wands | Oct. 15, 1907 |
| 1,502,525 | Ramsay | July 22, 1924 |
| 1,970,154 | Wade | Aug. 14, 1934 |